Sept. 14, 1926.
H. C. PARKER
ION CONCENTRATION CELL
Filed May 22, 1925
1,599,483
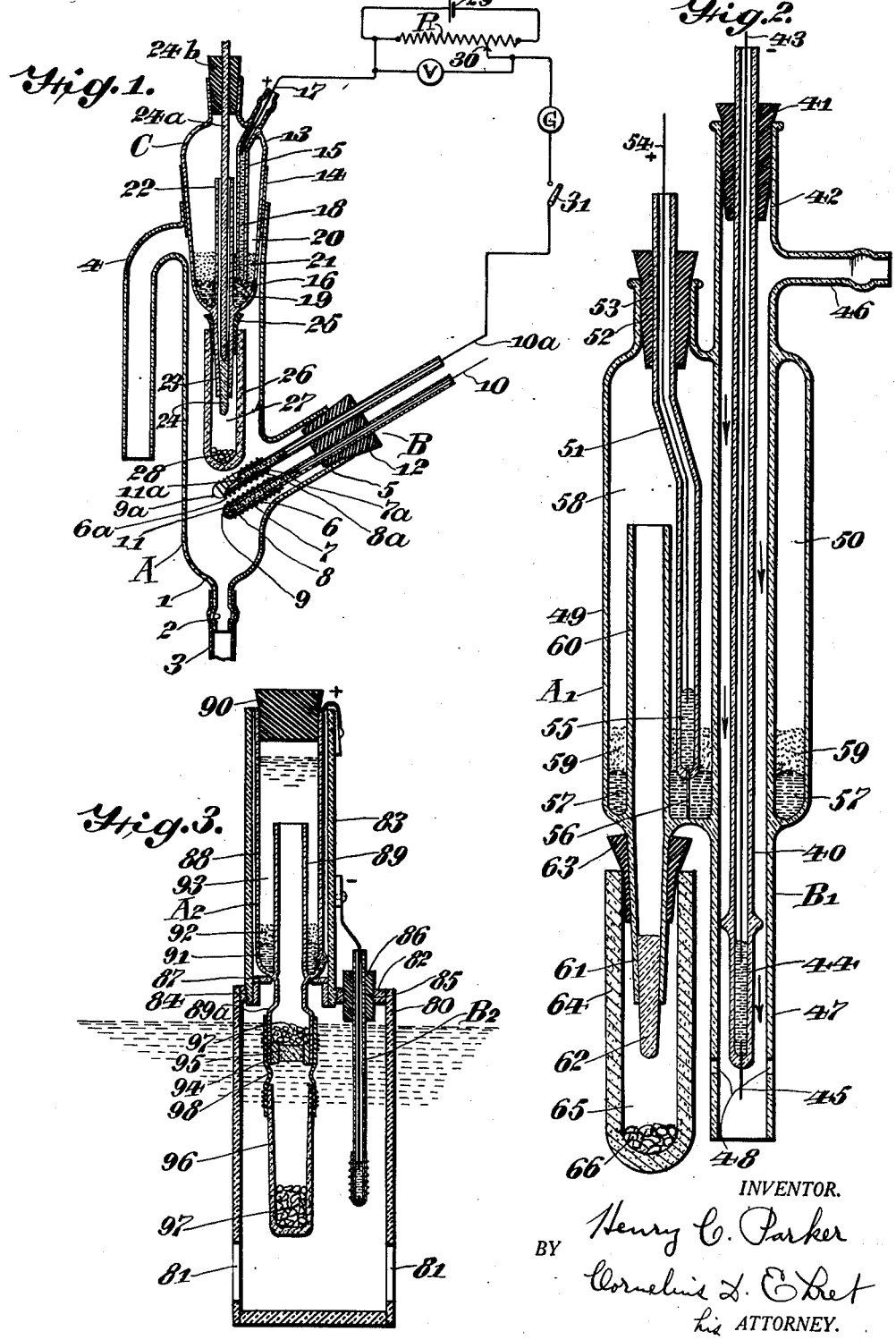
INVENTOR.
Henry C. Parker
BY Cornelius L. E. Bret
his ATTORNEY.

Patented Sept. 14, 1926.

1,599,483

UNITED STATES PATENT OFFICE.

HENRY C. PARKER, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

ION CONCENTRATION CELL.

Application filed May 22, 1925. Serial No. 32,090.

My invention relates to cells utilizable in the production of electro-motive-forces representative of the concentration of a selected ion, as of hydrogen, hydroxyl, etc., in a solution or electrolyte; and more particularly my invention relates to the means or structure for effecting or providing one of the electrodes of such a cell, such as a constant half cell.

In accordance with my invention a member of porous material, as unglazed earthenware, is utilized for effecting communication between the test solution or electrolyte and one electrode of the cell and for preventing diffusion of the test solution or electrolyte into the solution or electrolyte forming an essential portion of the half cell.

Further in accordance with my invention the aforesaid member of porous material may be in the form of a container in which is disposed a mass of soluble salt, generally potassium chloride, for maintaining in the half cell a saturated solution of the salt or a solution of constant strength.

Further in accordance with my invention there intervenes between the calomel or equivalent electrode material and the potassium chloride or equivalent solution co-acting with the aforesaid porous member or container, means for effecting restriction of the conductive path between the two solutions or materials of the half cell; and more particularly this structure comprises a movable or adjustable structure, as of glass, ground or closely fitting in a co-acting tubular member.

Further in accordance with my invention I provide a complete cell as a unitary structure comprising a half cell structure in combination with the hydrogen or other electrode and means for maintaining them in operative position with respect to each other.

Further in accordance with by invention the complete cell structure is of a character such that it may be itself directly immersed in a mass of flowing or quiescent electrolyte or through which the electrolyte or a predetermined fraction thereof may be continuously passed.

My invention resides in cell structures of the character hereinafter described and claimed.

For an illustration of some of the various forms my apparatus may take, reference is to be had to the accompanying drawing, in which:

Figure 1 is a sectional view of a complete cell.

Fig. 2 is a sectional view of a modification.

Fig. 3 is a sectional view of a further modification.

Referring to Figure 1, there is illustrated a complete cell for the production of an electro-motive-force varying with variations in the concentration of a selected ion of a solution or electrolyte which, or a predetermined fraction of which, is continuously passed through the cell structure which comprises the elongated vessel or tube A, of glass or other suitable material. This vessel is provided preferably at one end with an inlet 1 which in turn is provided with the enlarged portion 2 providing a fastening arrangement for a rubber tube 3 or the like. The vessel A is also provided, preferably near its opposite end, with an outwardly extending passage 4, forming an outlet for the solution or electrolyte. At any suitable point, preferably adjacent the inlet, the vessel A is provided with an outwardly extending open ended passage 5 adapted to receive an electrode designated generally at B.

The electrode B per se forms no part of my invention and may be constructed in any suitable manner, for instance, as a hydrogen or air electrode, or as indicated in my prior Patent 1,513,558. As shown, the electrode B includes the electrode 6 preferably of tungsten, though it may be of platinum, gold, palladium, or other suitable metal or conducting material, preferably neutral to the solution in which it is immersed, and having suitable high conductivity or low specific resistance. The electrode may be in the form of a wire as indicated, or in any other suitable form.

Electrode material 7 is disposed suitably adjacent to or in intimate contact with the electrode 6 of such character or composition as to yield oxygen or oxygen ions in sufficient quantity or at sufficient rate to saturate the solution adjacent or in the neighborhood of the electrode 6 with oxidant whose concentration in the solution is constant and definite.

In the example illustrated, the coating of electrode material 7 is formed of granular or finely subdivided oxygen-yielding material, such as manganese dioxide, cobaltic oxide, lead oxide and equivalents and is mixed with collodion or other suitable binder and rolled or otherwise applied in a layer upon the exterior of the tube or member 8, of glass or other suitable material, and there is then wound upon the coating 7 the electrode wire 6 which is sealed through the lower end of the tube 8 at 9 and is either connected directly to the conductor 10 or contacts within the tube 8 with a body of mercury 11 with which the conductor 10 connects. The tube 8 extends through a rubber or other stopper 12, which supports the electrode structure in the solution.

As shown in Fig. 1, other electrode structure is shown inserted in the stopper 12. This is a duplicate of that just described and, accordingly, the various parts have been assigned corresponding reference numerals with the sub-script "a" added in each case. If desirable, either or both electrode structures may be connected in the potentiometer circuit hereinafter described.

Designated generally at C and supported in the vessel A preferably at a point adjacent the passage 4 is the electrode vessel 13 formed of glass or other suitable material with which is associated structure forming the constant half cell. If desired, the surface of engagement between the members A and C may be cushioned by the rubber ring 14. Electrical communication with the interior of the electrode vessel 13 may be effected in any suitable manner and, as shown, a reentrant tube-like portion 15 is provided with a conductor 16, one end of which communicates with the interior of the electrode vessel 13, the other end being either directly connected to the conductor 17 or contacting with a body of mercury 18 with which the conductor 17 connects.

The electrode vessel 13 is provided with a suitable reference solution, electro-motive-force usually being developed by contact between a suitable metal and the reference solution, and in order to obtain constant electro-motive-force the solution should be kept of definite composition and concentration. Various metals in contact with a solution of their salts may be used for this purpose. For instance, a copper electrode may be used in a solution of copper sulphate; or a silver electrode in a solution of silver chloride and potassium chloride; or a hydrogen or air electrode or even the tungsten electrode illustrated in my prior Patent 1,513,558. As illustrated, however, a quantity of mercury 19 is disposed at the bottom of the electrode vessel 13 with which contacts a solution of potassium chloride 20, preferably saturated, containing calomel, i. e. monochloride of mercury, a supply of which in powdered form is indicated at 21 above the layer of mercury.

The electrode vessel 13 is also provided with the reentrant tube-like portion 22 of any suitable length sufficient to effect communication with that part of the electrode vessel containing the reference solution. The tube 22 extends outwardly of the electrode vessel thereby forming a spout-like member 23 fitted at its end with a plug of glass 24, preferably ground, for restricting the conductive path between the solutions in members 13 and 26. If desired, the member 23 instead of being provided with the plug 24 may be fitted at any suitable point with a mass of cotton, glass wool, or equivalent. When necessary a rod $24^a$, preferably of glass carried by the stopper $24^b$ of rubber, or equivalent, may be used to hold the plug in position.

Depending from the spout 23 and attached thereto in any suitable manner, as by the rubber ring 25, is the cup or member 26 of any suitable shape but preferably substantially as an elongated thimble. This thimble is formed of any suitable porous material as unglazed porcelain but it is to be understood that non-porous material may be used and fitted with a porous disc or plug of porous material, as filter paper, cotton wool, or equivalent. Disposed within the thimble 26 is a solution 27, preferably saturated, of any desired salt, preferably potassium chloride. It will be understood that the thimble 26 and the variable half cell contact with the test solution and due to the porosity of the thimble its contents gradually diffuse into the test solution and effect restricted contact therewith. The solution is kept saturated by means of extra crystals 28 of potassium chloride shown at the bottom of the thimble, and in this manner a constant supply of the solution is maintained without the use of a separate reservoir. When a potassium chloride solution is used in the thimble 26, the liquid junction potential between the two solutions is greatly reduced. Further, the solutions in the two chambers of the constant cell should be of the same nature, or substantially the same, since when the density is nearly identical the tendency for diffusion from one chamber to the other is slight. Further it is to be observed that the solution in the thimble 26 is of sufficient density to prevent diffusion of the test solution thereinto.

Although diffusion of the solution between the electrode vessel 13 and thimble 26 is prevented, the character of the intervening structure is such as to provide a film of liquid, around plug 24, between the solutions in the two chambers, thereby providing a conductive path for electric current from the solution in the thimble to that in the spout 23, from which the circuit is traceable through the solution in the reentrant portion 22 and electrode vessel 13, calomel 21, mercury 19, conductor 16, mercury 18 to conductor 17. The porosity of the thimble 26, or of a part thereof, as stated, permits gradual diffusion of the saturated solution therein into the test solution, with the result that the electrically conductive path is extended into the test solution from which it leads through the electrode B to the desired conductor 10 or 10$^a$.

For purposes of illustration merely, and without limitation of my invention, the electrodes are shown as connected with suitable apparatus for measuring voltages or differences of potential which are representative of the ion concentration. The measuring apparatus comprises a potentiometer having a source of current or battery 29 delivering current through the resistance R, one terminal of which is connected with the positive electrode. Movable along the resistance R is the contact 30 connected with the galvanometer G, which is connected upon closure of the switch 31 with the negative electrode. The contact 30 is moved along the resistance R to such position that the deflection of the galvanometer G is nil, in which case the fall of potential across that part of the resistance R to the left of the contact 30 is equal to the potential difference or voltage produced by the positive half cell and the other electrode in contact with the electrolyte. Such potential difference or voltage may then be directly read upon the deflecting voltmeter V.

Referring to Fig. 2, there is illustrated a complete cell, substantially unitary, although not necessarily so, preferably for insertion into a quiescent batch of a test solution or electrolyte. As shown, the positive half cell is designated at A$^1$ and the negative electrode at B$^1$.

As in Fig. 1 the negative electrode per se forms no part of my invention and hence may be of any suitable character, for instance, a well known hydrogen electrode. Briefly, this electrode includes the tube 40 of any suitable material, as glass, supported by the stopper 41 of rubber, or equivalent, inserted in the outwardly projecting tubelike portion 42. The conductor 43 is indicated as extending into a column of mercury 44 within the tube 40 through whose lower end is sealed the conductor 45 in contact with the mercury 44 and extending outwardly a suitable distance from the tube 40. Hydrogen gas is supplied under suitable pressure to the tube 46, passes downwardly through the outer tube 47 into contact with the plate 45, of platinum or the like, and escapes through the lateral apertures or holes 48 thereafter bubbling up through the solution to the atmosphere.

The positive half cell A$^1$ comprises the member 49 of glass, or other suitable material, preferably attached to and surrounding the outer tube 47, thereby forming a chamber 50. Electrical communication to the interior of the chamber 50 may be effected as desired; as shown a tube 51 of glass or like material is supported in the open ended mouth 52 by a stopper 53 of rubber or equivalent. The conductor 54 extends into a column of mercury 55 in the tube 51 through whose lower end is sealed the conductor 56 connecting the mercury 55 with mercury 57 in the chamber 50.

The chamber 50 corresponds to the electrode vessel 13 of Fig. 1 and is filled to any desired level, preferably entirely, with a suitable reference solution, constant electromotive-force preferably being maintained as in Fig. 1 by contact between a suitable metal and the reference solution. It is to be understood that the chamber 50 may be provided with any one of the several metals and solutions described as being suitable for use in the electrode vessel 13 of Fig. 1. As illustrated herein the contents of the chamber 50 are similar to the corresponding contents of the electrode vessel 13 and comprise a quantity of mercury 57 disposed at the bottom of the receptacle 50 with which contacts a solution of potassium chloride 58 containing calomel, a supply of which latter in powdered form is indicated at 59 above the layer of mercury.

In a manner substantially similar to Fig. 1 the chamber 50 is provided with a reentrant tube-like portion 60 of suitable length and is extended outwardly to form a spout-like member 61 carrying at its end the plug of glass 62, preferably ground, or equivalent. Supported on the spout, as by the rubber ring 63, is the thimble 64 substantially a duplicate of that disclosed in Fig. 1, and of any suitable material provided there is a porous portion in engagement with the test solution. Disposed within the thimble 64 is a solution of potassium chloride 65, or equivalent, and as in Fig. 1 maintained saturated by crystals 66 of the particular salt used.

As in Fig. 1, diffusion of the solutions between the chamber 50 and thimble 64 is substantially prevented, conductive engagement being obtained by the film around the plug 62. The remainder of the circuit through the test solution to the conductor 43 and through the reference solution to the conductor 54 is readily apparent.

It is to be understood that the positive and negative terminals of the test cell may be connected in any desired external circuit, for instance, the potentiometer circuit shown in Fig. 1.

Referring to Fig. 3, there is illustrated a complete cell, preferably for direct insertion into a flowing stream of water or other test solution.

As illustrated, a housing 80 formed of hard rubber, phenolic condensation product or other suitable material is provided for reception of the cell. A part of the housing 80 is arranged for direct insertion into the test solution or other electrolyte and is provided with holes or orifices 81 permitting ingress and egress of the solution. The part 80 is provided with a top 82 having a cut out portion adapted to receive the remainder of the housing, namely, a vertically extending open ended member 83. Union is effected between the top and the upper part of the housing in any desired manner as by the screw threaded arrangement 84.

Preferably, although not necessarily, the positive and negative electrode structures of Fig. 3 are distinct elements. The negative electrode designated generally at $B^2$ is supported in any desired manner but preferably, as shown, in the top 82 having an opening 85 to receive the stopper 86 of rubber or equivalent, the stopper receiving the electrode and firmly supporting the same.

As in Figs. 1 and 2, the negative electrode per se forms no part of my invention and may be of the type somewhat specifically described in connection with Fig. 1, and also in my prior Patent 1,513,558. It is to be understood, however, that any other suitable or desired type of negative electrode could be used.

The positive half cell $A^2$ is supported in the housing in any desired manner, but preferably as shown by the ring 87 of hard rubber or similar material suitably secured to the member 83 and contacting with an inwardly extending portion of the cell. The half cell includes the tubular portion 88 closed at the top by the stopper 90 of rubber, or equivalent and provided at its lower end with the reentrant tubular member 89 extending outwardly to form a depending spout $89^a$. The chamber thus formed, corresponding to the electrode vessel 13 and chamber 50 of Figs. 1 and 2 respectively, is provided with a quantity of mercury 91, upon which is disposed calomel, above which is a solution of potassium chloride and calomel extending above the outer end of the tube 89. In the protruding portion $89^a$ of tube 89 is a hollow plug 94 in which is disposed a plug 95 of porous material, as porcelain, cotton, asbestos or glass wool, or the like, effecting restricted conductive connection between the solution in the tube 89 and the potassium chloride solution, or equivalent, in the porous cup or thimble 96 containing salt crystals 97, some of which are also disposed above plug 95. The porous cup 96 is suitably supported, as by a rubber tube or sleeve 98, or equivalent, upon the tubular extension $89^a$, and contacts with the electrolyte disposed within or passing through the chamber 80.

What I claim is:—

1. The combination with means for utilizing or determining concentration of a selected ion of a test solution comprising an electrode including an electrically conductive liquid path, of means for restricting said liquid path, and means comprising a porous member for preventing passage of the test solution into the restricted liquid path.

2. The combination with means for utilizing or determining concentration of a selected ion of a test solution comprising an electrode including an electrically conductive liquid path, of means for restricting said liquid path, and means for preventing passage of the test solution into the restricted liquid path comprising a porous receptacle containing a reference solution.

3. The combination with means for utilizing or determining concentration of a selected ion comprising constant and variable half cells, and an electrically conductive liquid path leading from one of said half cells, of means for restricting said liquid path, and means comprising a porous member for preventing passage of a test solution into the restricted liquid path.

4. In combination, a half cell comprising interconnected chambers containing reference electrolytes, means preventing substantial mixing of said electrolytes while providing a conductive connection therebetween, and a second half cell in electrical communication through a test solution with the electrolyte in one of said chambers.

5. In combination, a half cell comprising interconnected chambers containing reference electrolytes, one of said chambers comprising porous wall structure, means preventing substantial mixing of said electrolytes while providing a conductive connection therebetween, and a second half cell in electrical communication through a test solution with the electrolyte in said one of said chambers.

6. In combination, a half cell comprising chambers having a passage extending therebetween and having reference electrolyte in each chamber, one of said chambers comprising porous wall structure, means comprising a plug in said passage for preventing substantial mixing of the electrolytes in said chambers while providing a conductive connection therebetween, and a second half cell in electrical communication through a test solution with the electrolyte in said one of said chambers.

7. In combination, a half cell comprising chambers having a passage extending therebetween and having reference electrolyte in each chamber, one of said chambers comprising porous wall structure, means comprising a ground glass plug in said passage for preventing substantial mixing of the electrolytes in said chambers while providing a conductive connection therebetween, and a second half cell in electrical communication through a test solution with the electrolyte in said one of said chambers.

8. A cell for utilizing or determining concentration of a selected ion comprising a receptacle containing potassium chloride and having a porous portion arranged for contact with an electrolyte.

9. A cell for utilizing or determining concentration of a selected ion comprising a receptacle containing potassium chloride solution and crystals and having a porous portion arranged for contact with an electrolyte.

10. A cell for utilizing or determining concentration of a selected ion comprising an unglazed earthenware receptacle containing a reference solution and crystals of the salt forming said reference solution.

11. A half cell comprising a receptacle divided into sections and having reference electrolyte in each section, and means preventing substantial mixing of said electrolytes while providing a conductive connection therebetween.

12. A half cell comprising a receptacle divided into sections, reference electrolyte having substantially the same density in both sections, and means preventing substantial mixing of said electrolytes while providing a conductive connection therebetween.

13. A half cell comprising a receptacle containing reference electrolyte, a second receptacle associated therewith containing a saturated solution of a reference electrolyte, and means preventing substantial mixing of said electrolytes while providing a conductive connection therebetween.

14. A half cell comprising a glass receptacle, an unglazed earthenware receptacle carried thereby, and a reference electrolyte and crystals of the material forming said electrolyte in said earthenware receptacle.

15. A half cell comprising a glass receptacle, another receptacle carried thereby having a portion of unglazed earthenware, and a ground glass plug in said glass receptacle between said receptacles.

16. A half cell comprising a receptacle provided with an outwardly extending portion affording communication with the interior thereof, and a receptacle having a porous portion carried by said outwardly extending portion.

17. A half cell comprising a receptacle provided with an outwardly extending portion affording communication with the interior thereof, an earthenware receptacle carried by said portion, and means restricting communication between said receptacles.

18. A half cell comprising a receptacle provided with reentrant and outwardly extending portions affording communication with the interior thereof a porous thimble carried by the latter portion, a reference solution in said receptacle, and an electrical terminal co-acting with said reference solution.

19. A half cell comprising a receptacle provided with reentrant and outwardly extending portions affording communication with the interior thereof, and an earthenware receptacle carried by said outwardly extending portion.

20. A half cell comprising a receptacle provided with reentrant and outwardly extending portions affording communication with the interior thereof, an earthenware receptacle carried by said outwardly extending portion, and a member in said portion restricting communication between the receptacles.

21. A half cell comprising a glass receptacle provided with reentrant and outwardly extending portions affording communication with the interior thereof, an earthenware receptacle carried by said outwardly extending portion, and a ground glass plug in said outwardly extending portion.

22. A cell for utilizing or determining concentration of a selected ion comprising a variable half cell, a constant half cell, and unitary supporting structure for said half cells.

23. A cell for utilizing or determining concentration of a selected ion comprising a variable half cell, a constant half cell, unitary supporting structure for said half cells, and means permitting passage of the test solution into engagement with said half cells.

HENRY C. PARKER.